United States Patent [19]

Ewer et al.

[11] Patent Number: 5,520,272

[45] Date of Patent: May 28, 1996

[54] COMBINATION MANUAL-AUTOMATIC HUB LOCK

[75] Inventors: Fred L. Ewer, Clackamas; Philip J. Cronin, II, Gladstone; John R. DuPree, Portland, all of Oreg.

[73] Assignee: Warn Industries, Inc., Milwaukie, Oreg.

[21] Appl. No.: 234,681

[22] Filed: Apr. 28, 1994

[51] Int. Cl.$^6$ .............. F16D 1/06; F16D 11/14; F16D 43/02

[52] U.S. Cl. .......... 192/36; 192/69.4; 192/69.43; 192/69.9; 192/83; 192/93 A; 192/95

[58] Field of Search .............. 192/36, 83, 67 R, 192/93 A, 94, 95, 69.43, 69.4, 69.9; 180/247; 403/1

[56] References Cited

U.S. PATENT DOCUMENTS

| | | |
|---|---|---|
| 3,442,361 | 5/1969 | Hegar ............... 192/67 R X |
| 4,223,772 | 9/1980 | Telford . |
| 4,266,646 | 5/1981 | Telford ............... 192/67 R |
| 4,327,821 | 5/1982 | Telford ............... 192/67 R X |
| 4,438,836 | 3/1984 | Kagata ............... 192/36 |
| 4,811,824 | 3/1989 | Kurihara . |
| 4,854,434 | 8/1989 | Kurihara . |

FOREIGN PATENT DOCUMENTS 0198527  9/1987  Japan ............... 192/95

*Primary Examiner*—Rodney H. Bonck
*Attorney, Agent, or Firm*—Klarquist, Sparkman, Campbell, Leigh & Whinston

[57] ABSTRACT

A hub lock device for converting a vehicle between four-wheel and two-wheel drive, the hub lock being actuated by automatic actuation or manual actuation. A sliding clutch ring that engages and disengages the wheel and axle is trapped in a cage. An extender bar from the cage has a hook end that hooks over the edge of a nut. The nut is moved between inner and outer positions by a manual dial. In the outer position, the nut forces the cage, through engagement of the hook end, to the position whereat the clutch ring is urged to interlock the axle and wheel. In the inner position the nut releases the cage, i.e., the hook can extend between an inner and outer position, to permit automatic actuation. The automatic actuation includes cam actuation wherein the spindle nut provides the cam actuator and brake surface for secondary cam actuation. The spindle nut is locked to the spindle with a lock pin projection extended from a thrust ring that enhances turning of the drive gear on the axle relative to the spindle nut in four-wheel drive.

6 Claims, 3 Drawing Sheets

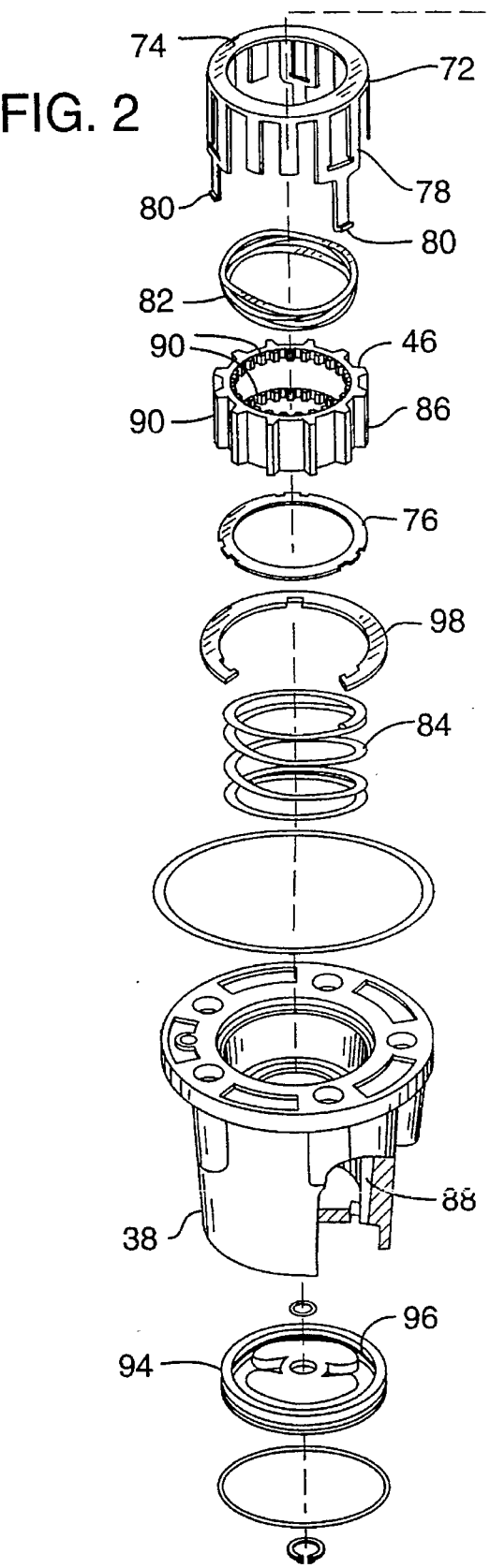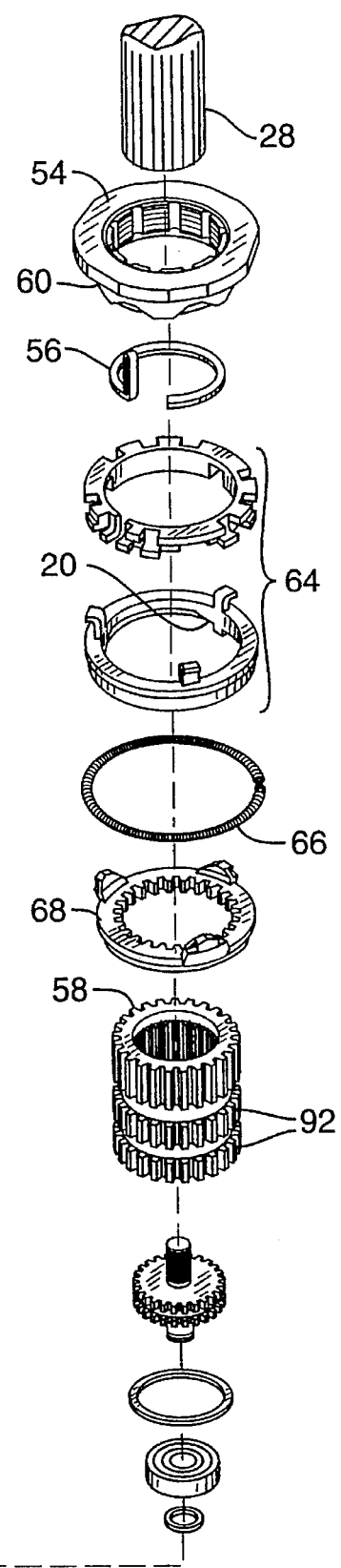

COMBINATION MANUAL-AUTOMATIC HUB LOCK

FIELD OF THE INVENTION

This invention relates to improvements to hub lock device for vehicles which are convertible between two-wheel and four-wheel drive, the hub lock device being actuated manually or automatically, and more particularly it relates to such a device having fewer operating parts and easier and more reliable manual operation.

BACKGROUND OF THE INVENTION

Vehicles having four-wheel drive capability that are designed for on-road and off-road use typically provide optional engagement/disengagement of two of the four wheels. Whereas the wheels to be disengaged are necessarily provided with a drive line from the transfer case to the wheels (a propeller shaft between the transfer case and differential and axles between the differential and the wheels), for on-road use and to avoid unnecessary energy consumption and wearing of the out of service drive line components, a first disconnect system disconnects the propeller shaft from the transfer case and a second disconnect system disconnects the axles from the wheels. This latter disconnect system is the hub lock device of the present invention.

The original hub lock devices were manually actuated. A driver/operator would stop the vehicle, engage the transfer case disconnect system and then manually turn a dial located in each wheel hub to activate the hub lock. Subsequently mechanism was developed to automatically activate the hub locks. One version (which is made part of the present invention) relies on cam actuation whereby a cam mechanism is powered by the rotation of the axles. With the propeller shaft disengaged at the transfer case, the wheel axles are non-rotating and the non-active cam mechanism allows the hub locks to disengage. With the propeller shaft engaged and thus the wheel axles rotated, the cam mechanism is activated to induce engagement of the hub locks.

Many four-wheel drive enthusiasts want both the convenience of automatic engagement and the security of manual engagement. A combination manual-automatic hub lock was first developed by Telford, U.S. Pat. No. 4,223,772. Other manual-automatic hub locks followed including U.S. Pat. Nos. 4,811,824 and 4,854,434.

Whereas the combination manual-automatic hub locks provide the desired result of enabling the operator to manually override the automatic system, the numerous parts involved render the device expensive to produce and maintain and the manual actuation somewhat difficult to operate. The present design requires fewer parts for more efficient production, easier manual operation and a more compact package of components for easier fit to the vehicle.

BRIEF DESCRIPTION OF THE INVENTION

The preferred embodiment of the present invention provides the drive gear fixedly splined to the axle and a clutch ring surrounding the drive gear that is slidably splined at its exterior to the hub housing. Gear teeth on the exterior of the drive gear and interior of the clutch ring achieve the desired locking and unlocking engagement as between the axle and hub housing with the clutch ring gear teeth moved into and out of engagement with the drive gear gear teeth.

The clutch ring is retained in a movable cage and the clutch ring moves with the cage. The cage includes outwardly directed fingers that have hook shaped ends that hook over a washer-like nut that is retained in the threads of a manual dial. The nut is moved in and out by turning the dial. The cage is forced to its outer/engaged condition with the nut screwed to its outer position. With the nut screwed to its inner position, the cage can move between an outer and inner (disengaged) position. The screw thread arrangement allows, e.g., a 360 degree rotation of the dial as opposed to prior dials having, e.g., 60 degrees of rotation. The mechanical advantages of the screw threads provides for easier turning of the dial.

With the nut screwed to its inner position, the cage is able to move in and out (the finger ends which are hook shaped simply extend beyond the nut when the cage is moved to its outer position). A spring urges the cage to the inner position and the clutch ring inside the cage to its disengaged condition. A cam mechanism located on the inward side of the cage forces the cage to its outer position (against the urging of the spring) when actuated by the rotating axle. A spindle nut has a combination of functions. It is screwed into a fixed spindle on the vehicle and provides a fixed cam surface for the primary camming action, and it further includes a brake surface for a secondary camming action. A rotating cam element resistively rotates on the brake surface. A cam follower slidably splined to the drive gear is rotated relative to the spindle nut upon turning of the axle and is urged outwardly by the spindle nuts fixed cam surface. The cage is moved outwardly (to the disengaged condition) by the cam follower with the secondary rotatable cam element completing the movement so as to avoid interference of the cam follower with the fixed cam. Such multiple functions of the spindle nut reduces the parts and provides a more compact package of components.

Other features include a combination lock pin/thrust washer that secures the spindle nut to the spindle while providing a thrust ring surface against which the drive gear rotates in four-wheel drive mode. The arrangement of components produces a more compact package as compared to prior automatic hub locks. Whereas the shaft needs to Be extended, it is less than in prior devices. Other differences and advantages of the invention as compared to prior manual-automatic hub lock devices will become more apparent upon reference to the following detailed description and drawings referred to therein.

DESCRIPTION OF THE DRAWINGS

FIG. 2 is an exploded view of the components of the preferred embodiment of the present invention.

DETAILED DESCRIPTION

Figure 1:
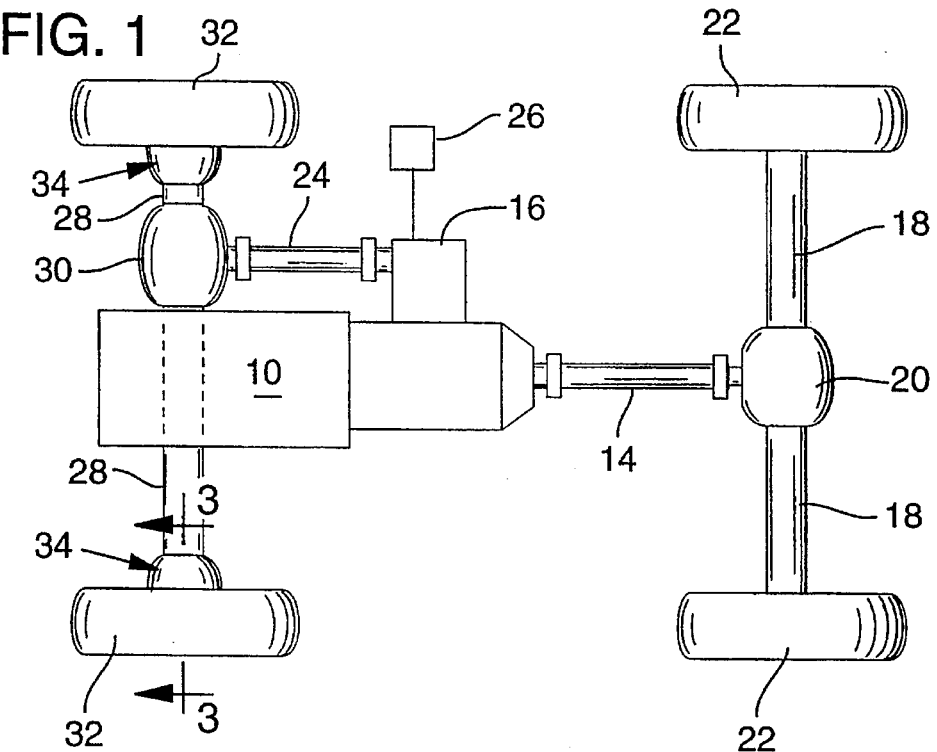
FIGS. 1 and 1A schematically illustrate the operation of a combination manual-automatic hub lock in accordance with the present invention.
Figure 1A:
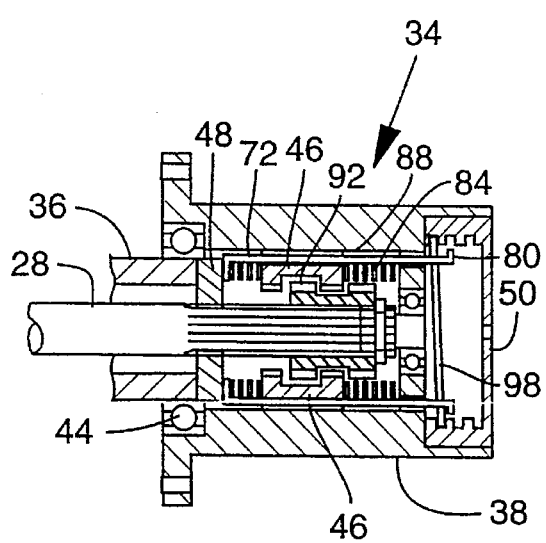

FIGS. 1 and 1A are intended to schematically illustrate the basic concept of a convertible four-wheel/two-wheel drive vehicle having hub locks in the front wheels. The hub locks are actuated either automatically by a cam means or manually.

In FIG. 1, the vehicles's motor 10 rotatively drives the vehicle's drive line including the rear propeller shaft 14 which connects to rear axles 18 through the rear differential 20. The rear axles 18 drive the rear wheels 22. A front propeller shaft 24 is selectively connected to the motor's drive shaft at the transfer case 16. The mechanism for connecting/disconnecting the propeller shaft 24 to and from the motor shaft is indicated at 26. The front propeller shaft 24 connects to the front axle 28 through front differential 30. The axles are selectively connected to the front wheels 32 by a hub lock connect/disconnect system 34 illustrated schematically in FIG. 1A.

FIG. 1A schematically illustrates the hub lock disconnect system 34. The axle 28 extends through a fixed or dead spindle 36 and into a hub lock housing 38. The hub lock housing 38 is secured to the wheel 32. The hub lock housing 38 is rotatably mounted to the spindle 36 indicated by bearings 44. Thus, the spindle is fixed to the vehicle frame and the axle 28 rotates inside the spindle and the wheel hub lock housing 38 and wheel 32 rotate on the spindle's exterior. The hub lock system 34 connects/disconnects the axle 28 to the hub lock housing and, thus, to the wheel 32. The connect/disconnect system includes a clutch ring 46, a cam mechanism 48 (between the fixed spindle 36 and rotatable axle 28) and a dial 50 in the outer end of the hub lock housing. As will be described in detail hereafter, the clutch ring 46 is moved between a first condition in which interior and exterior gear teeth on the clutch ring are connected respectively to gear teeth 92 on on the axle 28 and to gear teeth 88 on the hub lock housing 38, and a second condition where the gear teeth on the clutch ring are disconnected from the axle (the disconnected condition being shown in FIG. 1A). Movement to the second position is effected by a spring 84. Movement to the first condition is effected either manually by turning the dial 50 or automatically as a result of the actuation of cam mechanism 48. The cam mechanism is actuated when the axle 28 is caused to be rotated by the connection to the motor shaft.

Figure 4:
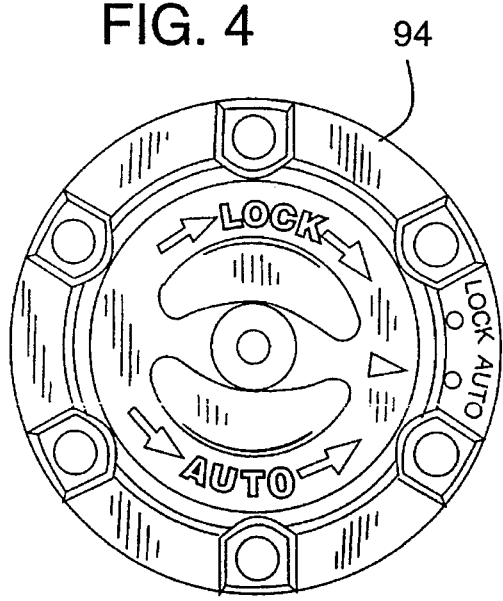
FIG. 4 is an end view of the hub lock with the dial position indicators.

The above general explanation of a connect/disconnect system for converting between two-wheel and four-wheel drive is intended to provide the reader with a general understanding of the concept of a hub lock system as contemplated for the present invention. A preferred embodiment will now be explained in greater detail with reference to FIGS. 2–4.

Spindle 36 (FIG. 3) is a fixed spindle and rotatively supports wheel hub 40 via bearings 44. The hub lock housing 38 is secured to the wheel hub 40 with bolts 42. Inside the wheel hub and hub lock housing, the end of spindle 36 is provided with screw threads 52 and a spindle nut 54 is screwed onto the screw threads 52. A combination keeper/thrust ring 56 secures the spindle nut to prevent unscrewing of the spindle nut and the thrust ring portion 56a provides a bearing surface for the drive gear 58 fixedly splined to the axle 28.

The spindle nut besides securing the bearing 44 to the spindle also provides a fixed cam surface 60. As will be later explained, the fixed cam surface 60 initiates automatic engagement of the clutch ring 46. The spindle nut 54 also provides a brake surface 62. Surrounding the spindle nut in engagement with brake surface 62 is a brake collar 64 that is compressed against the brake surface 62 by a compression spring 66. The collar 64 includes a secondary cam surface 70 that functions to maintain clutch ring engagement as will also later be explained. The cam follower 68 is positioned between the spindle nut with surrounding brake collar 64 and a cage 72. The cage 72 defines an enclosure having end walls 74, 76 and connecting bar 78 as best seen in FIG. 2 (but with end wall 76 separated from the cage 72). The bars 78 are seated in the roots of teeth 86 on the exterior of the clutch ring. Certain of the connecting bars extend beyond the end wall 76 and a hook 80 is provided on the end of the extensions.

Inside the cage 72 is the clutch ring 46 which is urged to its outer position within the cage (toward end wall 76) by a cage spring 82. The cage itself is urged toward an inner position (against cam follower 68) by a main spring 84 having one end anchored on the housing end wall and the other end pushing against end wall 76 of the cage.

The clutch ring teeth 86 are slidingly engaged with teeth 88 on the interior of the housing. Whereas the clutch ring 46 is movable between an interior position (bottom of FIG. 3) and an outer position (top of FIG. 3), teeth 86 and 88 are always engaged and the clutch ring and cage always rotates with the hub lock housing.

The clutch ring 46 has a pair of spaced teeth 90 on the inside which are mated to a pair of spaced teeth 92 on the drive gear 58 (secured to the axle 28). The teeth 90 are engaged with teeth 92 with the clutch ring in the outer position (the top position as viewed in FIG. 3) and disengaged from the clutch ring in the inner position (the bottom position as viewed in FIG. 3).

Figure 3:
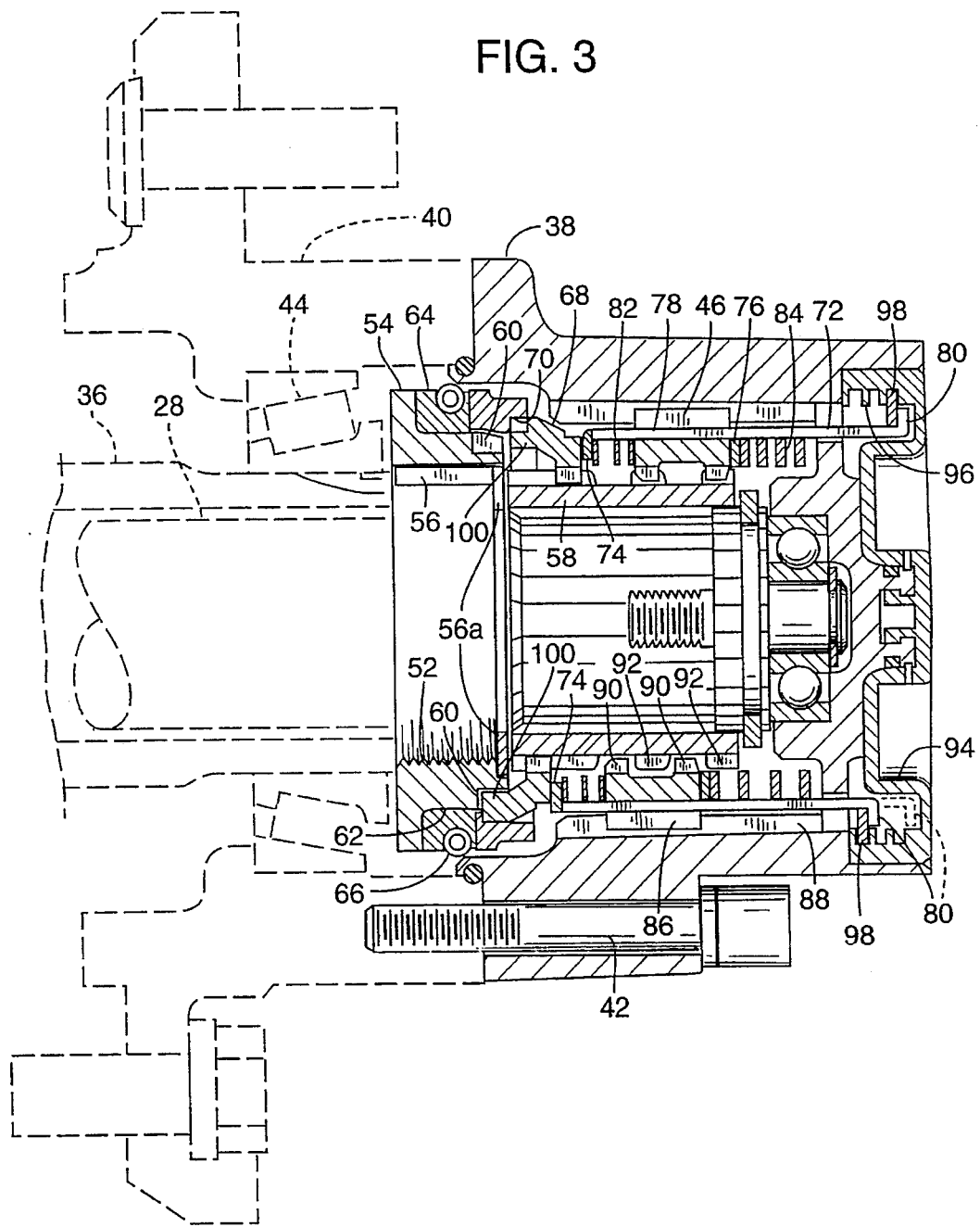
FIG. 3 is a cross section of an assembled hub lock in accordance with the present invention.

The mechanism for moving the clutch ring to its engaged position includes the cam actuated mechanism and the manual mechanism. Referring first to the manual mechanism, a dial member 94 includes a cylindrical portion that includes exterior threads 96. Trapped in the threads 96 is a nut 98. As illustrated in FIG. 3, the hook end 80 of the cage hooks over the inner side of nut 98. The nut is prevented from turning and, thus, turning the dial forces the nut 98 to travel in and out on the threads and to the illustrated inner and outer positions as illustrated in FIG. 3. The outer position is illustrated in the top view of FIG. 3 and the inner position is illustrated in the bottom view of FIG. 3. In the top view, the cage 72 is forced to the engaged position regardless of the cam actuation. In the bottom view, the hook end 80 is free to extend outwardly past the nut (as indicated in dash lines) and, thus, the cage and clutch ring are subject to the connect/disconnect actuation of the cam mechanism.

The cam mechanism includes the fixed cam surface 60 on the spindle nut 54, the brake collar 64 and its cam surface 70, and cam follower 68 and its spline connection to the rotatable drive gear 58. Rotation of the drive gear forces ramping of follower tab 100 along the ramp of cam surface 60 and in the process is forced axially outward. Follower 68 abuts the end wall 74 of cage 72 and forces it outwardly. Assuming the initial movement of the cage will occur when gear teeth 90 of the clutch ring are out of alignment with gear teeth 92 of drive gear 58, such movement will force compression of cage spring 82. When the teeth 90, 92 become aligned, the clutch ring will engage the drive gear on the axle and because the clutch ring is always engaged with gear teeth 88 of the housing, the axle and housing become engaged. As follower tab 100 moves to the inner end of fixed cam surface 60, it engages secondary cam surface 70 of the brake collar 64. Because the collar resists but does not prevent rotation, the initial contact of the follower tab will force some further outward movement of the follower before the brake collar is forced to rotate. This additional movement spaces the follower tab 100 from the fixed cam surface 60 to avoid interference as between the tab and fixed cam surface.

In operation, two-wheel drive results with the motor's drive shaft disconnected from the propeller shaft 24 in transfer case 16, and with the clutch ring 46 positioned inward, i.e., with gear teeth 90 and 92 disengaged as seen in the bottom portion of FIG. 3. This condition requires that the manual setting of the dial (See FIG. 4) be set at the "auto" position wherein the nut 98 is at its inward position. Connecting the motor's drive shaft to the propeller shaft 24 and, thus, to the axle 28, forces actuation of the cam mechanism as described above and, thus, movement of the clutch ring 46 to its engaged position as seen in the upper portion of FIG. 3. Manual locking occurs simply by rotating the dial clockwise as seen in FIG. 5 which requires almost a 360 degree rotation of the dial before the arrow position indicator points to the locked position. A 360 degree turn provides a mechanical advantage and, thus, easier turning.

A significant improvement of the present invention resides in the relationship of the cage (in particular the bar extensions having hook shaped ends), the screw threads on the dial, and the nut that is positioned in and out by rotation of the dial. The screw threads function as a shallow ramp for the nut and because the nut is what engages the hook ends and not the threads, the nut can be moved to its inner position with sufficient turning of the dial and the nut does not interfere with the automatic actuation of the cam mechanism. In prior devices the dial included a ramp that directly contacted the cage end and so as to allow freedom of cage movement for automatic actuation, the ramp was necessarily steep and manual turning for manual engagement was difficult.

We claim:

1. A combination manual-automatic hub lock device for connecting/disconnecting a wheel axle to a wheel on a vehicle wherein said vehicle has a fixed spindle, a wheel rotatively mounted to the exterior of the spindle and a wheel axle having axially directed gear teeth rotatively mounted and extended through the interior of the spindle, said hub lock device in operative position comprising:

a hub lock housing secured to the wheel and surrounding the gear teeth on the axle, an interior surface of said housing having axially directed gear teeth spaced radially from the axle gear teeth, and a clutch ring having inner and outer gear teeth surrounding said axle within said housing and slidably movable into and out of common engagement with the axle and housing gear teeth to interlock and unlock the axle to the hub lock housing and accordingly to the vehicle wheel;

an axially slidable cage movable between inner and outer positions and having inner and outer end walls positioned to trap the clutch ring therebetween whereby sliding movement of the cage between inner and outer positions urges sliding movement of the clutch ring out of and into common engagement with the gear teeth of the housing and axle; and said hub lock housing having an exposed end defining an outer side, a manually actuable dial rotatably mounted in said housing end and a shaft portion on said dial, a nut member provided on said dial and axially movable to inner and outer positions in said housing upon turning of said dial, an extender bar extended from said outer end wall of the cage and terminating in a hook end, said hook end of said extender bar extended to the outer side of said nut member whereby outwardly directed movement of the nut member engages said hook member and forces said cage to its outer position with the clutch ring gear teeth urged into common engagement with the axle and housing gear teeth.

2. A combination manual-automatic hub lock device as defined in claim 1 wherein a screw thread is formed on the shaft portion of said dial, said nut member including a screw thread portion that is mated to the screw thread formed on the dial shaft, said nut member prevented from turning relative to the housing and accordingly being axially movable relative to said dial and housing upon rotative turning of the dial.

3. A combination manual-automatic hub lock device defined in claim 1 wherein a fixed cam surface is provided on the spindle and a cam follower is slidably mounted to the axle, said cam follower adjacent the inner end wall of the cage and rotatable with the axle whereby the follower engages the cam surface and is forced outwardly on the axle for engaging the cage and moving the cage to its outer position.

4. A combination manual-automatic hub lock device as defined in claim 3 wherein a spindle nut is mounted to the spindle and the fixed cam surface is provided on the spindle nut.

5. A combination manual-automatic hub lock device as defined in claim 4 wherein a drive gear is splined to the end of the axle and the gear teeth of the axle are provided on the drive gear, keeper/thrust ring combination having a locking portion locking the spindle nut to the spindle and a thrust ring portion positioned between the spindle nut and the drive gear.

6. A combination manual-automatic hub lock device as defined in claim 4 wherein a braking surface is provided on the spindle nut, the braking member resistively rotatably mounted on the brake surface of the spindle nut, and a cam surface provided on the brake member that is engaged by the cam follower to space the cam follower from the cam surface and the spindle nut.

\* \* \* \* \*

UNITED STATES PATENT AND TRADEMARK OFFICE
CERTIFICATE OF CORRECTION

PATENT NO.    :   5,520,272

DATED         :   May 28, 1996

INVENTOR(S)   :   Ewer et al.

It is certified that error appears in the above-identified patent and that said Letters Patent is hereby corrected as shown below:

Column 5, line 34, "teeth rotatively" should be --teeth thereon rotatively--;

Column 5, line 37, "housing secured" should be --housing adapted to be secured--;

Column 5, line 37, "and surrounding" should be --and to surround--;

Column 5, line 39, "teeth spaced" should be --teeth adapted to be spaced--;

Column 5, line 41, "teeth surrounding" should be --teeth adapted to surround--;

Column 5, line 42, "and slidably" should be --and to be slidably--;

Column 5, line 50, "positions urges" should be --positions is adapted to urge--;

Column 6, line 12, "member engages" should be --member is adapted to engage--;

Column 6, line 13, "forces" should be --force--;

Column 6, line 25, "is provided" should be --is adapted to be provided--;

Column 6, line 26, "is slidably" should be --is adapted to be slidably--;

Column 6, line 27, "follower adjacent" should be --follower being positioned adjacent--;

UNITED STATES PATENT AND TRADEMARK OFFICE
CERTIFICATE OF CORRECTION

PATENT NO. : 5,520,272

DATED : May 28, 1996

INVENTOR(S) : Ewer et al.

It is certified that error appears in the above-identified patent and that said Letters Patent is hereby corrected as shown below:

Column 6, line 28, "and rotatable" should be --and adapted to rotate--;

Column 6, line 33, "is mounted" should be --is adapted to be mounted--;

Column 6, line 37, "is splined" should be --is adapted to be splined--;

Column 6, line 38, "and the" should be --and to provide the--;

Column 6, line 38-39, "axle are provided on the drive gear" should be --axle,--;

Column 6, line 39, ", keeper/thrust ring" should be --, and which further comprises a keeper/thrust ring--;

Column 6, line 40, "portion locking" should be --portion adapted to lock--;

Column 6, line 45, "the" (2nd occ.) should be --a--.

Column 6, line 45, "member resistively" should be --member is resistively--;

Column 6, line 46, "brake" should be --braking--;

Column 6, line 47, "surface provided" should be --surface is provided--;

UNITED STATES PATENT AND TRADEMARK OFFICE
CERTIFICATE OF CORRECTION

PATENT NO. : 5,520,272
DATED : May 28, 1996
INVENTOR(S) : Ewer, et al.

It is certified that error appears in the above-indentified patent and that said Letters Patent is hereby corrected as shown below:

Column 6, line 47, "brake" should be --braking--.

Signed and Sealed this

Eighth Day of October, 1996

Attest:

BRUCE LEHMAN

Attesting Officer        Commissioner of Patents and Trademarks